(12) United States Patent
Osepchuk (10) Patent No.: US 7,034,739 B2
(45) Date of Patent: Apr. 25, 2006

(54) DELIVERY OF QUASI-PERIODIC PULSES OF EM ENERGY UTILIZING THE PRINCIPLE OF BEATING-WAVE AMPLIFICATION

(76) Inventor: John M. Osepchuk, 248 Deacon Haynes Rd., Concord, MA (US) 01742

( * ) Notice: Subject to any disclaimer, the term of this patent is extended or adjusted under 35 U.S.C. 154(b) by 67 days.

(21) Appl. No.: 10/409,029

(22) Filed: Apr. 7, 2003

(65) Prior Publication Data
US 2006/0038714 A1    Feb. 23, 2006

Related U.S. Application Data

(60) Provisional application No. 60/370,720, filed on Apr. 5, 2002.

(51) Int. Cl.
*G01S 13/89* (2006.01)
(52) U.S. Cl. .............. 342/22; 342/27; 342/54; 342/59; 342/85
(58) Field of Classification Search ........... 342/175, 342/22, 27, 52–54, 59, 82–85, 88, 463; 250/237 R; 372/18, 21, 97
See application file for complete search history.

(56) References Cited

U.S. PATENT DOCUMENTS 3,877,002 A * 4/1975 Cheal et al. .............. 340/552
4,091,367 A * 5/1978 Harman .................... 340/552
4,234,856 A   11/1980 Jung et al.
4,264,876 A    4/1981 Jung et al.
4,596,967 A *  6/1986 Ekdahl ...................... 331/82
4,733,236 A    3/1988 Matosian (Continued)

OTHER PUBLICATIONS

"A three-frequency scatterometer technique for the measurement of ocean wave spectra", Schuler, D.L.; Keller, W.C.; Plant, W.J.; Oceanic Engineering, IEEE Journal of vol. 16, Issue 3, Jul. 1991 Ps:244-253.*

*Primary Examiner*—John B. Sotomayor
(74) *Attorney, Agent, or Firm*—Hamilton, Brook, Smith & Reynolds, P.C.

(57) ABSTRACT

The present invention is related a method and system for irradiating a target location or material with high-amplitude narrow pulses of electromagnetic (EM) energy at a periodic or quasi-periodic rate. The method and system comprises generating at least three electromagnetic signals simultaneously in space from at least three sources, each signal having the same repetition rate and a different frequency, and directing each signal to at least one predetermined target, and adjusting the phase of each signal, so that its peak field occurs at the same instant as the occurrence of the peak fields of all the signals at the target.

32 Claims, 5 Drawing Sheets

U.S. PATENT DOCUMENTS

| | | | |
|---|---|---|---|
| 4,889,526 A * | 12/1989 | Rauscher et al. | 600/14 |
| 4,967,077 A * | 10/1990 | Watson | 250/237 R |
| 5,019,768 A | 5/1991 | Criswell et al. | |
| 5,052,013 A * | 9/1991 | Putnam | 372/97 |
| 5,054,027 A * | 10/1991 | Goodberlet et al. | 372/25 |
| 5,129,305 A | 7/1992 | Reilly | |
| 5,144,636 A * | 9/1992 | Yoshida et al. | 372/50 |
| 5,223,781 A | 6/1993 | Criswell et al. | |
| 5,506,473 A | 4/1996 | Aucouturier et al. | |
| 5,587,207 A | 12/1996 | Gorokhovsky | |
| 6,058,129 A * | 5/2000 | Voelckel et al. | 372/97 |
| 6,492,637 B1 * | 12/2002 | Fujita | 250/231.13 |
| 6,690,002 B1 * | 2/2004 | Kuroda et al. | 250/214 R |
| 2002/0076069 A1 | 6/2002 | Norris et al. | |
| 2002/0126854 A1 | 9/2002 | Norris et al. | |

* cited by examiner

DELIVERY OF QUASI-PERIODIC PULSES OF EM ENERGY UTILIZING THE PRINCIPLE OF BEATING-WAVE AMPLIFICATION

RELATED APPLICATION(S)

This application claims the benefit of U.S. Provisional Application No. 60/370,720, filed Apr. 5, 2002 the entire teachings of which are incorporated herein by reference.

BACKGROUND OF THE INVENTION

Producing a high concentration of electromagnetic energy into small regions involving free space is useful for the hyperthermia treatment of cancer, short-pulsed radar, and high energy beams.

SUMMARY OF INVENTION

A need exists for a method and system for generating different frequencies of electromagnetic energy (EM) and concentrating the energy at a target location in space. It is also advantageous to provide a method and system for adjusting the value of this periodic rate to some low frequency, perhaps in the audio range, to enhance the effect on the target which is being sought.

The present invention is related to a method and system for irradiating a target location or material with high-amplitude narrow pulses of electromagnetic (EM) energy at a periodic or quasi-periodic rate. The method and system comprises generating at least three electromagnetic signals simultaneously in space from at least three sources, each signal having the same repetition rate and a different frequency, and directing each signal to at least one predetermined target, and adjusting the phase of each signal, so that its peak field occurs at the same instant as the occurrence of the peak fields of all the signals at the target.

The method and system further comprise non-linear effects provided at the at least one predetermined target. The non-linear effects include at least one member selected from a group consisting of amplifier saturation, rectification, mixing, intermodulation, peak heating, and breakdown.

The at least three electromagnetic signals can be high-amplitude pulses, wherein the high-amplitude pulses are periodic or quasi-periodic pulses. Further, the high-amplitude pulses can change the material properties of the target, can be an electromagnetic weapon, and can be a microwave weapon. Lower frequency information can be modulated on the at least three electromagnetic signals.

Precise control of the time delays of the pulses radiated from the individual elements allows the concentration of energy within regions where the pulses may overlap in a coherent fashion. This approach is similar to using time delays for array beam steering. In fact, as the target area is moved away from the array into the far zone, the focusing of power into small regions degenerates into a beam-steering problem.

Antennas can be used to direct each signal to at least one predetermined target, wherein the antennas includes at least one member selected from a group consisting of dipole antennas, horn antennas, and dishes. Further, each antenna can radiate waves of the same polarization in space and produces roughly the same field magnitude at the at least one predetermined target. Each source can generate power of equal magnitude.

The frequencies can be derived from mixing a precise lower frequency $\Delta f$ with $f_0$, wherein $\Delta f = \sim 1$ kHz and $f_0 = \sim 1$ MHZ to form an equally-spaced comb of frequencies, wherein the comb of frequencies can be like a mode-locked laser. A computer can be used to control the steps of generating, directing, and adjusting.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

In general, the present invention delivers different high-amplitude pulses to a target location in space. The high-amplitude pulses produce non-linear effects at the target. Types of these effects can include an amplifier saturation effect, a rectification effect, a mixing effect, an intermodulation effect, an peak heating effect, and a breakdown effect.

The high-amplitude pulses can be used to change the material properties of the target. For example, the pulses can be used to change the material properties of foods, ceramics, plasmas, etc. Further, the high-amplitude pulses can also be used as an electromagnetic (EM) weapon or microwave weapon. For example, the pulses can be used to cause radio frequency interference (RFI) at the target, produce induction of acoustic waves in the target material through the conversion effect underlying the microwave auditory (hearing) effect resulting from transient thermal expansion in the material undergoing exposure to EM energy, and produce induction of electrostimulation in living tissue. For electrostimulation, uni-polar (mono-phasic) pulses are required without the subsequent presence of pulses of opposite polarity for a period of time comparable to or approaching the time constant associated with the type of electrostimulation. It is believed that the required post-pulse quiescent period can be shortened when the non-linear pulse excitation is sufficiently high in magnitude.

Low-frequency or direct-current (D.C.) components cannot be radiated in real-world antenna systems for systems that deliver EM or microwave energy to the target through radiation. Broadband antennas can show a viable bandwidth of about a decade in frequency, but do not approach baseband at microwave frequencies.

Practical radiating systems cannot radiate baseband signals, very-low frequency signals, or high-frequency signals (e.g. a microwave, a millimeter-wave, and an optical wave). However, modulation can be imposed on the radiated signals with low-frequency information that will allow "detection" of such low-frequency content through non-linear interaction at the target location or material.

A simple example is described using amplitude-modulation (AM), such as used in AM radio broadcasting. If a radio-frequency signal at $f_0$ (e.g. 1 MHZ) is amplitude-modulated at a frequency $\Delta f$ (e.g. 1 kHz), the radiated signal exhibits, in addition to the carrier signal at $f_0$, sidebands at $f_0 \pm \Delta f$ with amplitudes that increase with the degree (index) of modulation. The radiated energy contains no signal at $\Delta f$ in its spectrum, but only signals at $f_0$ and $f_0 \pm \Delta f$. When the radiated energy is received by an antenna and delivered to a system (e.g. a radio receiver), the low-frequency signal at $\Delta f$ is created through non-linear detection of the radiated signal. In a sense, the signals at $f_0$ and $f_0 \pm \Delta f$ "beat" at the target/receiver to create peak radio-frequency (RF) amplitudes at a rate of $\Delta f$. The non-linear response of the receiver/detector creates the desired low frequency of $\Delta f$. For example, creating a sound at $\Delta f \sim 1$ kHz.

Although, in this example, three radiated signals were created by applying AM to one carrier at $f_0$, it is possible to create a similar beating effect by independently creating signals at $f_0$, $f_0 - \Delta f$, and $f_0 + \Delta f$. Control of relative phases at $f_0$, $f_0 \pm \Delta f$ may be necessary to be the equivalent of the AM broadcast signal.

In general, the three arbitrary signals at $f_0$, $f_0 - \Delta f$, and $f_0 + \Delta f$ exhibit beating-wave phenomena when the three signals (waves) are present at one given point in space, e.g., where a target may be present. Thus, with appropriate periodic phase adjustment at a rate of $\Delta f$, the phases of all three signals are at the value for maximum amplitude. The field amplitudes at a given point are $E_0 \cos 2\pi f_0 t$, $E_- \cos 2\pi (f_0 - \Delta f)t$, and $E_+ \cos 2\pi (f_0 + \Delta f)t$; where at t=0, the total field amplitude is $E_0 + E_- + E_+$. This repeats at a rate of $\Delta f$. In a similar manner, negative pulses $(-E_0 - E_- - E_+)$ and zeroes can appear cyclically if a different phase adjustment is made.

The above-mentioned example can be generalized for N signals at N different frequencies with arbitrary amplitudes. Therefore, using frequencies $0.xxx\ f_0 \ldots 1.000\ f_0 \ldots 1.yyy\ f_0$, beating-wave phenomena occur at repetition rates as low as $f_0 1000$, at a rate low enough to accommodate the appropriate phases of the N signals at commensurate frequencies to produce peaks or zeros. The peak fields $= \Sigma E_i$ can be large, e.g. if N signals are of equal amplitude $E_0$, then the peak field at repetitive moments is $NE_0$. This can be dubbed as "beating-wave amplification." Thus, instantaneous peak $NE_0$ can be much greater than $(N)^{1/2} E_0$, which is the field amplitude if all N signals are at the same frequency and combined through summation of the signals before radiation from the antenna.

This "amplification" does not violate any laws of conservation of energy, just as the "amplification" in a resonant cavity or in a standing wave does not violate conservation of energy. In the case of beating-wave amplification of the peaks of N coexistent signals, the amplification occurs at isolated moments while other isolated moments show inordinately low field amplitudes.

Now referring to FIGS. 1–4, portions of the waveform are derived from 23 coexistent waves, at 23 different frequencies, varying from 0.1 to 2.0 $f_0$, have been calculated for an arbitrary set of 23 signals of equal amplitude $E_0$ at 0.10, 0.15, 0.20, 0.25, 0.30, 0.40, 0.45, 0.50, 0.60, 0.70, 0.80, 0.90, 1.00, 1.20, 1.25, 1.35, 1.45, 1.50, 1.55, 1.65, 1.75, 1.85, and 2.00 GHz. As shown in FIGS. 1A and 1B, each wave has a peak E field amplitude of $E_0$ and an identical phase at t=0. FIGS. 1A and 11B show peaks as large as $\pm 23\ E_0$ in value. Only one of these waveforms will result from an appropriate phase adjustment.

Figure 2:
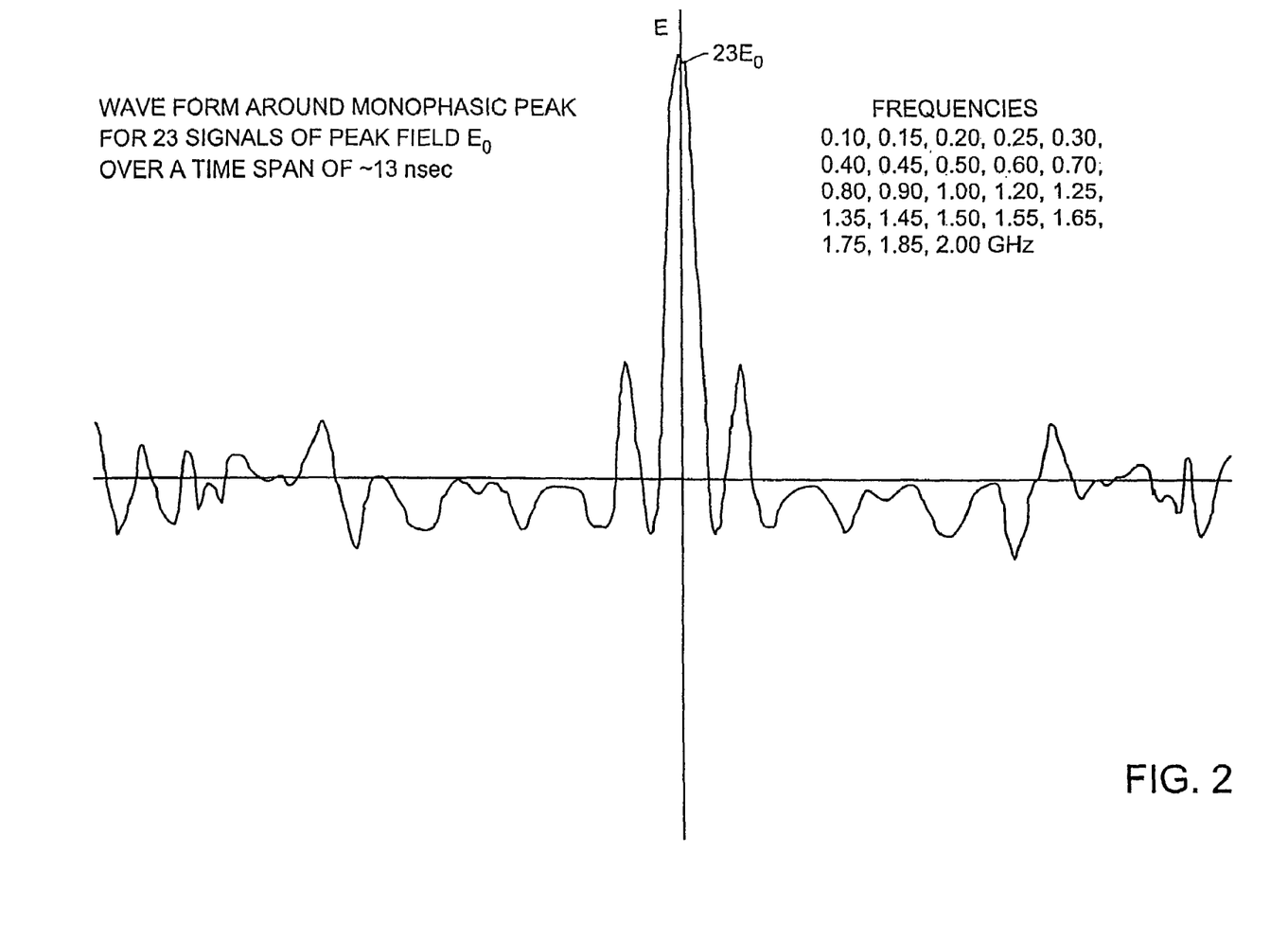
FIG. 2 is a plot of the mono-phasic peak for a beating waveform (amplitude versus time) from 23 signals of the peak field (E), over a time span of 13 nanoseconds (nsec)

FIG. 2 shows a calculated waveform around a peak field (A) moment. The mono-phasic nature of the peak is apparent for the time period shown, which is about 6.5 periods at 1 GHz (or $f_0$) on either side of the peak.

Figure 3:
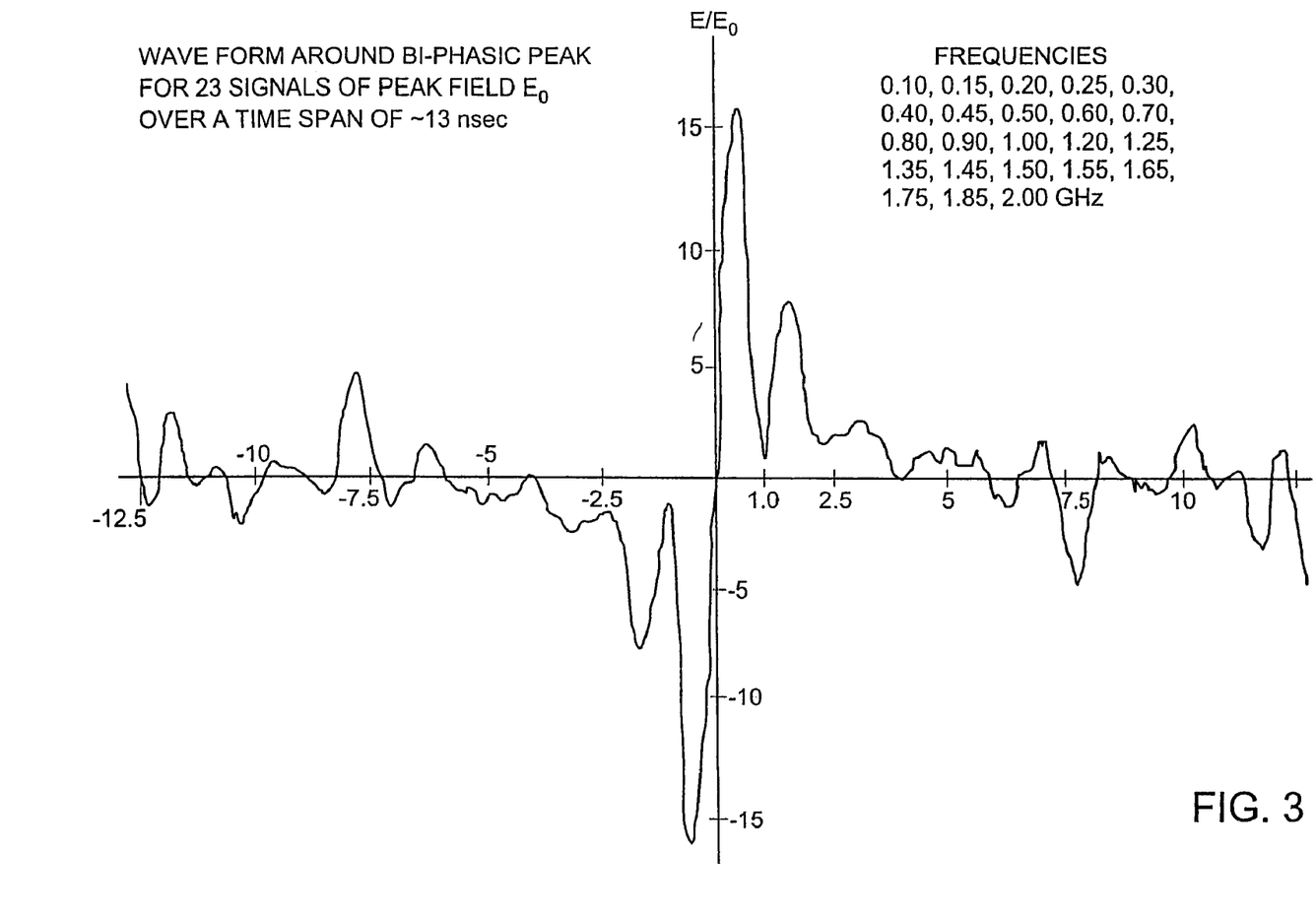
FIG. 3 is a plot of the bi-phasic peak for an expected beating waveform (amplitude versus time) from 23 signals of peak field (E), over a time span of about 13 nsec.

FIG. 3 shows the waveform after appropriate phase adjustment around a bi-phasic peak, where the largest value of $dE/dt$ occurs. The waveform is bi-phasic in nature close to the zero crossing. The waveform is shown for 6.5 periods at 1 GHz on either side of the zero crossing. The feature of a sharp isolated peak field is indicative of the goals sought for dramatic beating-wave amplification and provides visible support for the validity and value of the proposed system.

The waveform shows occasional peaks resembling an ultra-wideband (UWB) pulse. In fact, a frequency span of 0.1 to 2.0 $f_0$ is ultra-wideband. Thus, even if the number of signals is finite, the pulses resemble those derived from a continuous frequency spectrum of similar extent. In the case described above, the large peak of 23 $E_0$ is not compensated for a significant time period around t=0, i.e. for many periods at frequency $f_0$. Thus, the pulses of large amplitudes have a better chance of exciting or triggering a non-linear effect in a target before being counteracted by fields of opposite polarity.

Figure 4:
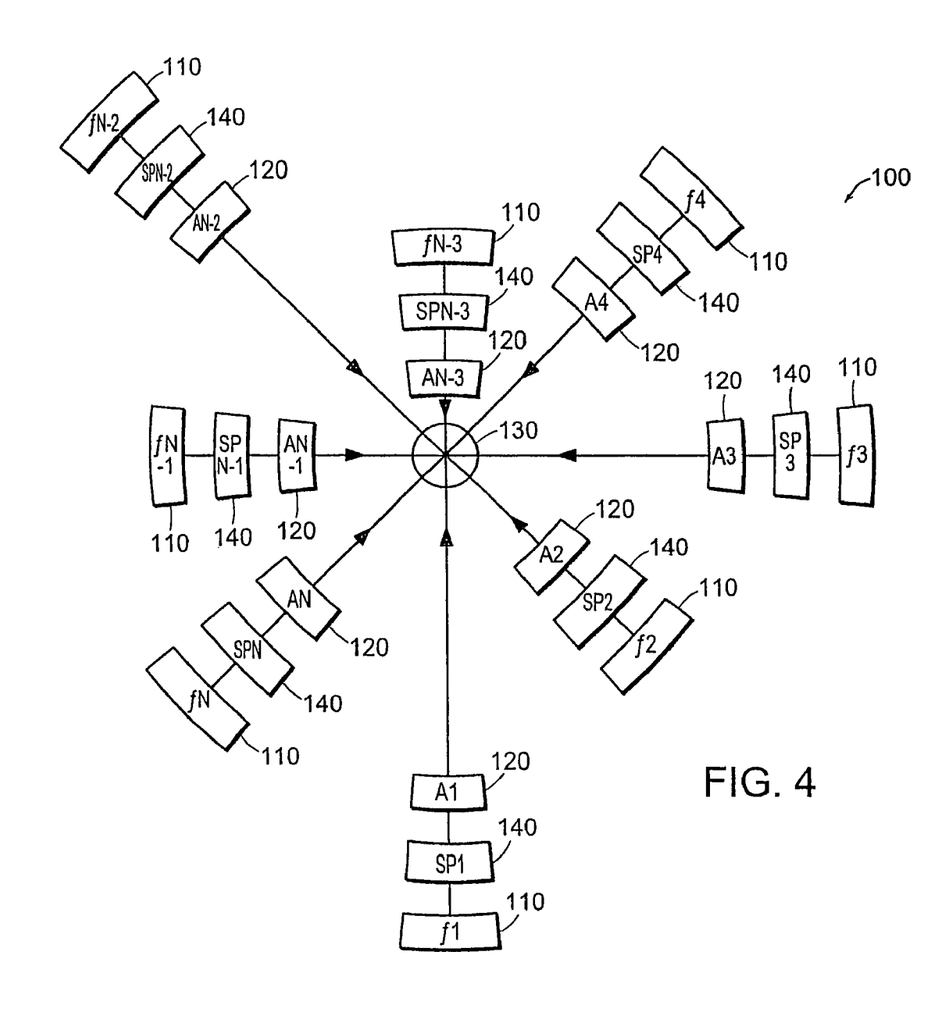
FIG. 4 is a schematic block diagram of one embodiment of the invention to irradiate a target with waves exhibiting beating waveform amplification as shown in FIGS. 2 and 3.

The above described beating-wave principles have been incorporated into the system 100 shown in FIG. 4. There are N sources 110 generating EM power at N different frequencies. Each source 110 generates power of equal or comparable magnitude. The antennas 120 are adapted to provide preferential radiation to a target location 130 in space. At low microwave frequencies these antennas 120, $A_1 \ldots A_n$, may be simple dipoles or horns of the same E polarization in space. At millimeter-wave frequencies or higher (optical) frequencies the antennas 120 may be dishes all focused to the target location 130 in space. There may be suitable phase control in the "signal processing box" 140 in the fields from the N sources 110, $F_1 \ldots F_n$, to the N antennas 120. If N is large, e.g. N ~1000, the beating-wave amplification can be substantial, e.g. ~1000 thus enhancing the probability of triggering the desired non-linear interaction in the target location 130 or material.

In FIG. 4, each source 110 at $f_i$ to $f_n$ is first processed in signal processors 140 $Sp_i \ldots Sp_n$, e.g. amplified, phase-adjusted and pulsed on/off to reduce duty cycle and average power while achieving the highest feasible peak fields during the on pulse, e.g. $d_a \sim 0.001$, allowing the peak field $E_i$ to be ~30 x the $E_i$ associated with the average power at N=1000. The processed signals from each source 110 are coupled to antennas 120, $A_1 \ldots A_n$, and radiated to the target 130. With N~1000 to achieve instantaneous peak fields at the target in the range of 10 to 100 kV/m then $E_i \sim 10$ to 100 V/m peak for each elemental beam. It should be understood by one skilled in the art, the antenna array 120 in FIG. 4 is two-dimensional for optimum performance. It is also understood that all the features of advanced antenna arrays can be applied to this system. For example, small efficient solid-state sources can help attain minimum size.

Further, the choice of the N different frequencies in the array is a key determinant of system performance. Computer calculations for large N can help the design process by an iterative process. Listed below are design considerations:

(a) For any N different frequencies, the beating-wave peak amplification of the N signals of fields $E_0$ will be N $E_0$ at some instants;

(b) The period T of beating-wave repetition is the larger of the greater the number of significant figures in the matrix of frequency values. Thus, if there are six(6) significant figures, e.g. 0.xxxxxx $f_0$ ... 1.000000 $f_0$ ... 1.yyyyyy $f_0$ ... $2f_0$, the repetitive time period could approach a limit of $10^6/f_0 10^6 \tau_0$. Thus, if $f_0$=1 GHz, then T could approach 1 millisecond;

(c) By an iterative process of computer calculations, one can seek out a list of N different frequencies that optimize the desired beating waveform while remaining in a band of frequencies that can be practically radiated with decent gain to a target location. One objective is to achieve a waveform with substantial time delay between the time for a beating-wave peak to the time where wave amplitudes of opposite polarity dominate;

(d) All antennas $A_1$ ... $A_n$ should radiate waves of the same E polarization in space and roughly the same E field magnitude at the target. In special cases there may be reasons for considering alternative polarizations, including circular polarization or different polarizations; and (e) The choice of frequencies is limited only by the requirement of precise frequency control and commensurate relationship. In one embodiment, the N different frequency is derived from mixing a precise lower frequency $\Delta f$ with $f_0$ to form an equally-spaced comb of frequencies similar in nature to the spectrum of a mode-locked laser. Amplification is applied appropriately to the signals in the comb.

If the free-space E amplitudes at the target 130 are large enough, it should be possible to achieve dramatic effects associated with nonlinear responses in the target, whether RFI, acoustic signal generation, electrostimulation or other effects to be determined for new targets. In all cases, high peak E fields at the target become feasible because of the beating-wave amplification process. The usual objective is a periodic production of high peak fields, but quasi-periodic pulses would also be acceptable if the main feature of amplification remains.

Figure 1A:
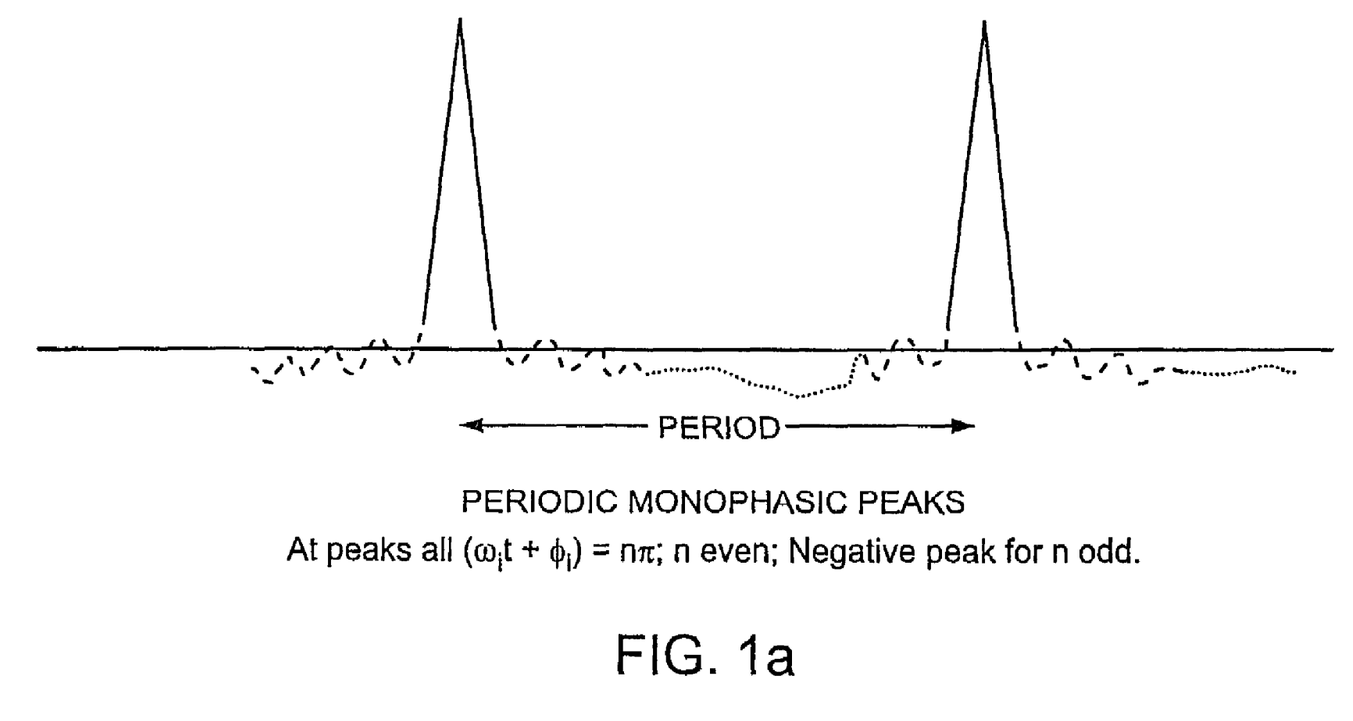
FIG. 1A is a plot of the periodic mono-phasic peak of one possible beating waveform (amplitude versus time) from many signals.
Figure 1B:
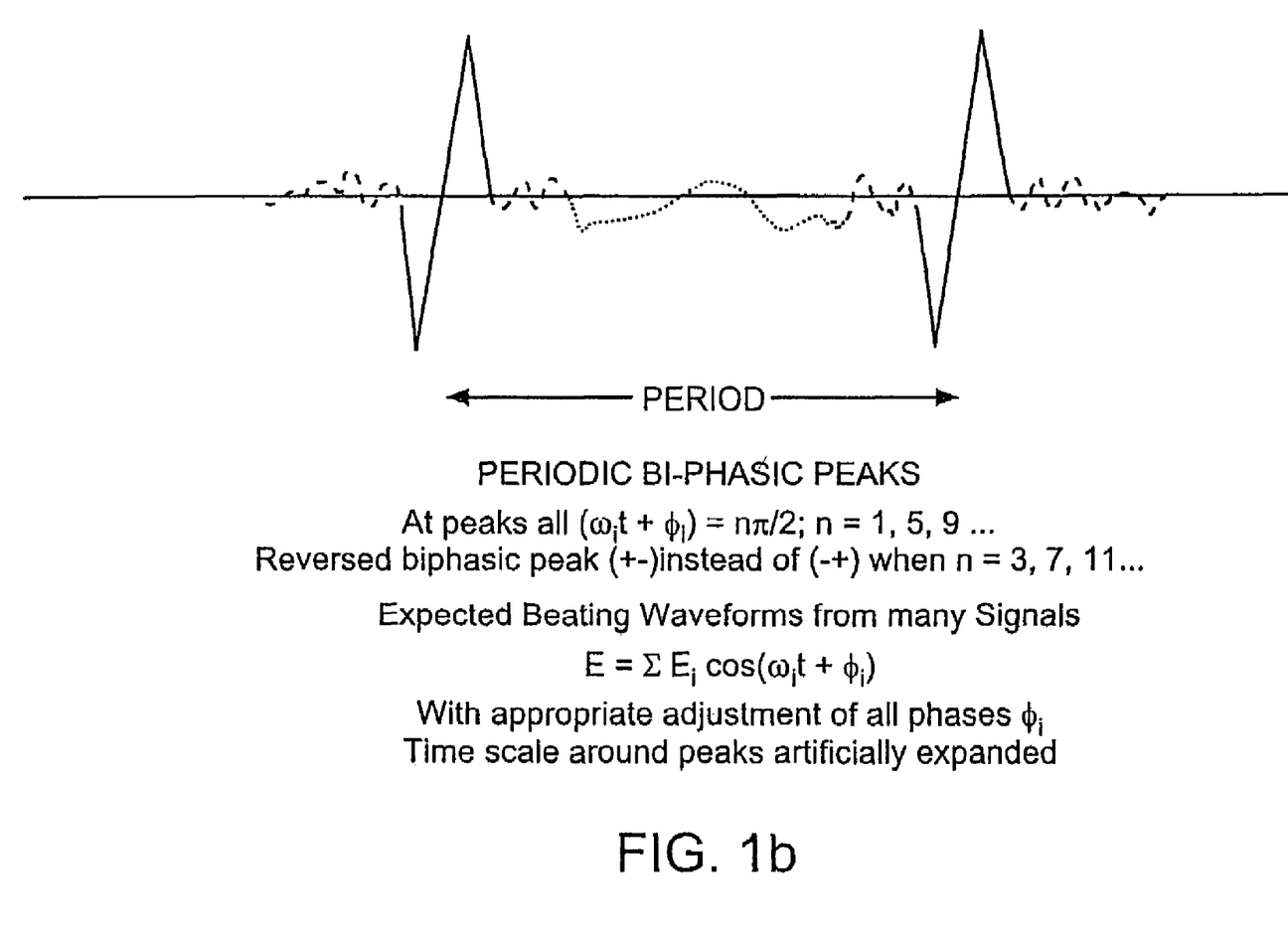
FIG. 1B is a plot of the periodic bi-phasic peak of another possible beating waveform (amplitude versus time) from many signals.

In FIGS. 1A and 2, the phases $\phi_i$ of the 23 signals are all set to $\phi_i$=0 at the target location to permit the occurrence of the peak E field of positive polarization at t= 0 at the target location. Referring to FIG. 4, for a given target location 130, the phases of all the signal sources in the array have to be adjusted appropriately either through calculation or empirical adjustment.

To generate a comb of frequencies, a signal of precisely controlled frequency, e.g. $\Delta f$=0.100000000GHz, is mixed with a signal at $f_0$ to get $f_0 \pm \Delta f$, ... $f_0 \pm N\Delta f$. These N+1 signals, at low level, can be filtered and amplified to desired levels and sent individually to the appropriate antenna 120.

Appropriate switching of phases can be advantageous to having not just $A^+$ peak but also any of the other peaks. A computer can be helpful with these calculations. The appropriate phase condition at each antenna is now imposed. Thus, if we want peak type $A^+$ peak at the target location 130, at time t=0, the phase at the antennas at any moment must be:

$$\phi_i = 2\pi l_i f_i/c \quad (1)$$

where $l_i$ is the distance from antenna i to the target, $f_i$ is the frequency at antenna i and c is the velocity of light (or phase velocity in any medium that fills that space).

Therefore, if any moment condition (1) is met there will be the a positive beating-wave peak at the target 130 periodically. Thus, if all $l_i$ are equal we want the same phase at all antennas 120 at some (any) moment. If the target location 130 changes, we want immediately (in a suitable time period) to change phases so that condition (1) is met for the new series of $l_i$ values. Therefore, we now want a negative peak instead of a positive peak, we need at some moment to satisfy:

$$\phi_i = 2\pi l_i f_i/c + \pi \quad (2)$$

or if we want bi-phasic peak (−+) we must satisfy:

$$\phi_i = 2\pi l_i f_i/c + \pi/2 \quad (3)$$

and if we want bi-phasic peak (+−) we must satisfy:

$$\phi_i = 2\pi l_i f_i/c - \pi 2 \quad (4)$$

For a given target location 130, where the peak E field is adjusted for a maximum, the field at that point will exhibit periodic or quasi-periodic variation of the local field as long as the values of the frequencies exhibit a finite number of digits. At other spatial locations, the time variation will not show the maximum peak achievable by beating-wave amplification. It is expected that the dimension of the area or volume in space where there is substantial approximation to maximum peak fields is of the order of a quarter-wavelength at the center frequency of the whole spectrum of frequencies being employed.

The location of the optimum target point can be changed by an appropriate change in the phases of all signal sources. With reference to FIG. 4, this is achieved using the appropriate phase-shifter included in the transmission path of each signal source 110. This type of spatial variation would be similar to a scanning procedure in a phased-array radar. The production of the maximum temporal peaks in E field could be arranged to occur over a larger spatial extent (area or volume), albeit with a smaller duty cycle or larger repetition period, i.e., if the "scanning" is periodic in nature.

Thus, system 100 can be used to produce "amplified" E field peaks over a desired area or volume with appropriate scanning schedules or programs. The potential effects in the target location 130, or material can be more effectively or broadly produced using a computer program.

While this invention has been particularly shown and described with references to preferred embodiments thereof, it will be understood by those skilled in the art that various changes in form and details may be made therein without departing from the scope of the invention encompassed by the appended claims.

What is claimed is:

1. The method of propagating beating waves comprising the steps of:
   (a) generating at least three electromagnetic signals simultaneously in space from at least three sources, each signal having the same repetition rate and a different frequency and;
   (b) directing each signal to at least one predetermined target; and
   (c) adjusting the phase of each signal, so that its peak field occurs at the same instant as the occurrence of the peak fields of all the signals at the target.

2. The method of claim 1, further comprising providing non-linear effects at the at least one predetermined target.

3. The method of claim 2, wherein the non-linear effects includes at least one member selected from a group consisting of amplifier saturation, rectification, mixing, intermodulation, peak heating, and breakdown.

4. The method of claim 1, wherein the at least three electromagnetic signals are high-amplitude pulses.

5. The method of claim 4, wherein the high-amplitude pulses are periodic or quasi-periodic pulses.

6. The method of claim 4, wherein the high-amplitude pulses change the material properties of the target.

7. The method of claim 4, wherein the high-amplitude pulses form an electromagnetic weapon.

8. The method of claim 4, wherein the high-amplitude pulses form a microwave weapon.

9. The method of claim 1, further comprising modulating lower frequency information on the at least three electromagnetic signals.

10. The method of claim 1, wherein each source generates power of equal magnitude.

11. The method of claim 1, wherein antennas are used to direct each signal to at least one predetermined target.

12. The method of claim 11, wherein the antennas includes at least one member selected from a group consisting of dipole antennas, horn antennas, and dishes.

13. The method of claim 11, wherein each antenna radiates waves of the same polarization in space and produces roughly the same field magnitude at the at least one predetermined target.

14. The method of claim 1, wherein the frequencies are derived from mixing a precise lower frequency $\Delta f$ with $f_0$ to form an equally-spaced comb of frequencies.

15. The method of claim 14, wherein the comb of frequencies is like a mode-locked laser.

16. The method of claim 1, wherein a computer controls the steps of generating, directing, and adjusting.

17. A system for propagating beating waves comprising:
(a) at least three electromagnetic signals generated simultaneously in space from at least three sources, each signal having a repetition rate and a different frequency and;
(b) each signal directed to at least one predetermined target; and
(c) the phase of each signal adjusted so that its peak field occurs at the same instant as the occurrence of the peak fields of all the signals at the target.

18. The system of claim 17, further comprising non-linear effects provided at the at least one predetermined target.

19. The system of claim 18, wherein the non-linear effects includes at least one member selected from a group consisting of amplifier saturation, rectification, mixing, intermodulation, peak heating, and breakdown.

20. The system of claim 17, wherein the at least three electromagnetic signals are high-amplitude pulses.

21. The system of claim 20, wherein the high-amplitude pulses are periodic or quasi-periodic pulses.

22. The system of claim 20, wherein the high-amplitude pulses change the material properties of the target.

23. The system of claim 20, wherein the high-amplitude pulses form an electromagnetic weapon.

24. The system of claim 20, wherein the high-amplitude pulses form a microwave weapon.

25. The system of claim 17, further comprising lower frequency information modulated on the at least three electromagnetic signals.

26. The system of claim 17, wherein each source generates power of equal magnitude.

27. The system of claim 17, wherein antennas are used to direct each signal to at least one predetermined target.

28. The system of claim 27, wherein the antennas includes at least one member selected from a group consisting of dipole antennas, horn antennas, and dishes.

29. The system of claim 27, wherein each antenna radiates waves of the same polarization in space and produces roughly the same field magnitude at the at least one predetermined target.

30. The system of claim 17, wherein the frequencies are derived from mixing a precise lower frequency $\Delta f$ with $f_0$ to form an equally-spaced comb of frequencies.

31. The system of claim 30, wherein the comb of frequencies is like a mode-locked laser.

32. The system of claim 17, wherein a computer controls the steps of generating, directing, and adjusting.

* * * * *